(12) United States Patent
Chen

(10) Patent No.: US 6,967,749 B2
(45) Date of Patent: Nov. 22, 2005

(54) DUPLEX SCANNER CAPABLE OF CALIBRATING TWO-SIDED DOCUMENTS

(75) Inventor: Michael Chen, Hsinchu (TW)

(73) Assignee: Avision, Inc., Hsinchu (TW)

( * ) Notice: Subject to any disclaimer, the term of this patent is extended or adjusted under 35 U.S.C. 154(b) by 804 days.

(21) Appl. No.: 09/931,099

(22) Filed: Aug. 17, 2001

(65) Prior Publication Data

US 2002/0033968 A1    Mar. 21, 2002

(30) Foreign Application Priority Data

Sep. 21, 2000    (TW) .............................. 89216391 U

(51) Int. Cl.$^7$ ............................................. H04N 1/00

(52) U.S. Cl. ...................... 358/406; 358/504; 358/474; 358/496; 358/497; 358/1.9; 382/315; 382/318; 382/275

(58) Field of Search .............................. 358/504, 406, 358/474, 496, 497, 498, 483, 514, 509, 463, 358/443, 1.15, 1.9; 382/315, 318, 319, 295, 382/275

(56) References Cited

U.S. PATENT DOCUMENTS

| 4,967,233 | A | * | 10/1990 | Buchar et al. ............... 358/496 |
| 5,280,368 | A | * | 1/1994 | Fullerton ..................... 358/474 |
| 6,069,715 | A | * | 5/2000 | Wang .......................... 358/498 |
| 6,327,047 | B1 | * | 12/2001 | Motamed .................... 358/1.15 |
| 6,344,906 | B1 | * | 2/2002 | Gatto et al. ................. 358/443 |
| 6,694,062 | B1 | * | 2/2004 | Yang ........................... 382/275 |

* cited by examiner

Primary Examiner—Kimberly Williams
Assistant Examiner—Beniyam Menberu
(74) Attorney, Agent, or Firm—Rabin & Berdo, P.C.

(57) ABSTRACT

A duplex scanner capable of calibrating the two-sided documents comprises an automatic document feeder (ADF), an upper carriage and an upper calibration paper. The upper carriage is installed in the ADF and the upper calibration paper is installed under the upper carriage. Alternatively, the upper carriage is movable installed in the ADF while the upper calibration paper is fixed in the duplex scanner and corresponding to the upper carriage. Before image scanning, the relative motion between the upper carriage and the first calibration paper is generated for calibrating the light beam information. According to the invention, the effects of the contaminated upper calibration paper for the calibration of the light beam information can be reduced, and the quality of the scanning image is greatly enhanced.

1 Claim, 4 Drawing Sheets

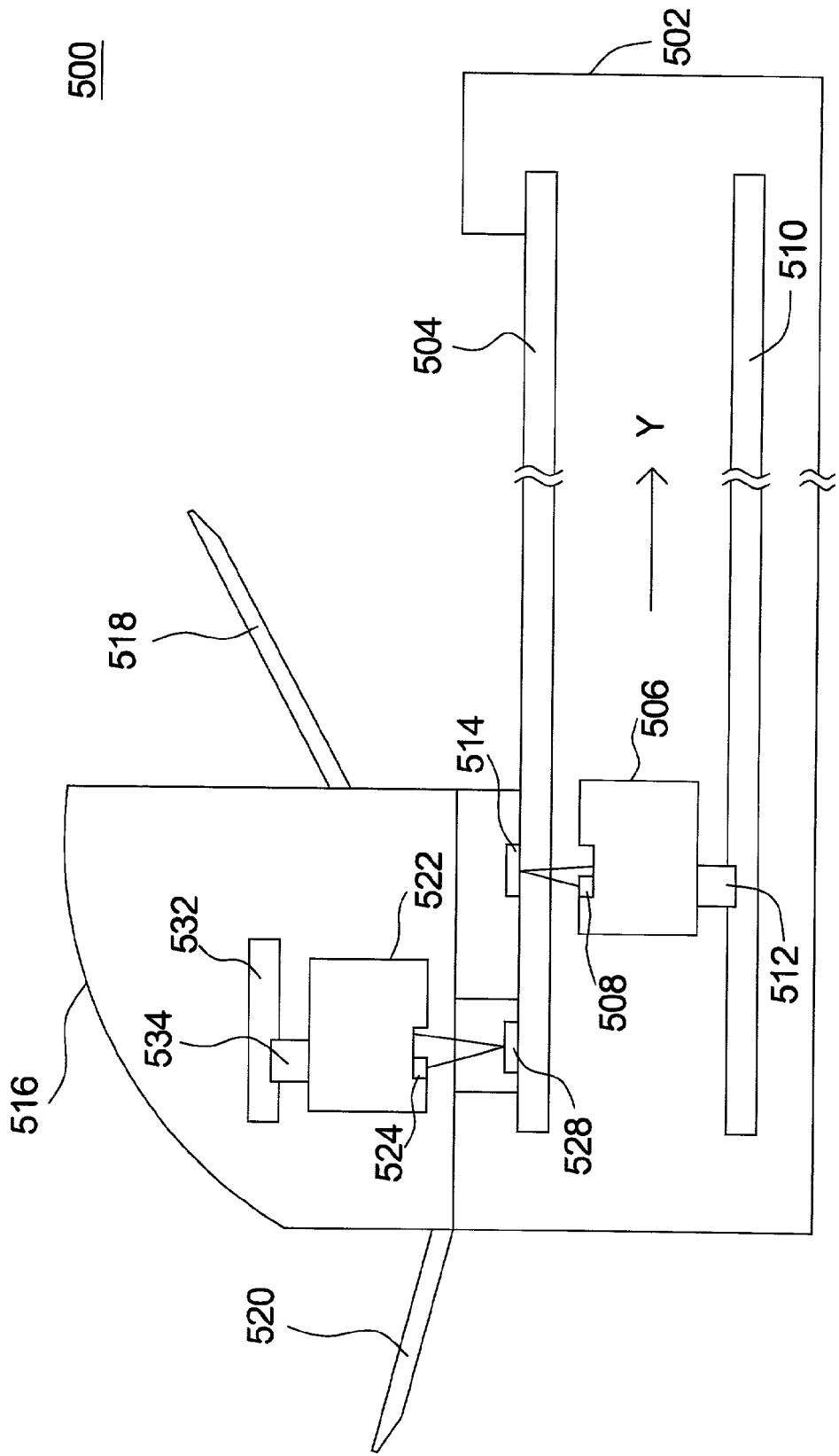

DUPLEX SCANNER CAPABLE OF CALIBRATING TWO-SIDED DOCUMENTS

This application incorporates by reference Taiwanese application Ser. No. 089216391, filed Sep. 21, 2000.

BACKGROUND OF THE INVENTION

1. Field of the Invention

The invention relates in general to a duplex scanner capable of calibrating the two-sided documents, and more particularly to a duplex scanner capable of effectively calibrating the light information of the two-sided documents.

2. Description of the Related Art

With the rapid evolution of computer technology, consumers increasingly demand quality scan images; therefore, producers endeavor to improve the quality of scan image in terms of image resolution and accuracy. Referring to FIG. 1, which depicts the conventional flatbed scanner. The flatbed scanner 100 has a case 102, and the to-be-scanned document (not shown in FIG. 1) is placed on the transparent platen 104. A lower carriage 106 is installed inside the case 102, and a light source 108 is equipped on the lower carriage 106. The flatbed scanner 100 also has the driving device 110 to move the lower carriage 106 forward and backward in a direction parallel to Y-axis. Additionally, a connecting apparatus 112 is equipped for connecting the lower carriage 106 and the driving device 110.

When the scanner starts to scan, the driving device 110 transmits the lower carriage 106 and the light source 108 by the connecting apparatus 112. In the meanwhile, light is first emitted by the light source 108 and then reflected by the to-be-scanned document on the transparent platen 104. Subsequently, light reflected from to-be-scanned document is further reflected by several reflectors 114, and focused on the photoelectric sensing device 118 by the lens 116. Afterward, light received by the photoelectric sensing device 118 is converted into electronic signals. Then, the flatbed scanner 100 further deals with the electric signals to complete the image capture.

The photoelectric sensing device can be any device capable of converting the light signal into the electric signal, such as a Charged Coupled Device (CCD), or a Contact Image Sensor (CIS). The driving device 110 can be any device capable of transmitting the lower carriage 106, such as a leather belt, a steel belt, or the like. The driving device 110 is further connected to a transmitting apparatus (not shown in FIG. 1) such as the assembly of reduction gears and a motor.

FIG. 2 depicts a top view of the conventional flatbed scanner in FIG. 1 during the calibration of the light beam information. Please also refer to FIG. 1. Before scanning the to-be-scanned document, calibration of the light beam information, such as color calibration, brightness calibration, and contrast calibration, have to be performed. In FIG. 1, a lower calibration paper 120 is further installed in the flatbed scanner 100, and fixed on the transparent platen 104. The lower calibration paper 120 extends along the X-direction, like the lower carriage 106. Besides calibration of the light beam information, the lower calibration paper 120 functions in various ways, such as calibration of a start-to-scan point.

Color calibration is taken as an example to illustrate the application of the conventional scanner. The lower calibration paper 120 has either a white region as standard white, or a black region as standard black for the flatbed scanner 100. The standard white is illustrated herein. When the scanner performs color calibration, the driving device 110 drives the lower carriage 106 through the connecting apparatus 112, and the lower carriage 106 is moved under the lower calibration paper 120. Then, the lower carriage 106 starts to scan a scan line 202 on the lower calibration paper 120, wherein the scan line 202 is parallel to the lower carriage 106. Light is first emitted by the light source 108, and then reflected by the lower calibration paper 120. Subsequently, light focused on the photoelectric sensing device 118 is converted into analog electronic signals. The analog electronic signals corresponding to the standard white is further converted to the standard white digital value. Each detecting unit of the photoelectric sensing device 118 is corresponded to a standard white digital value; however, the corresponding standard white digital value of each detecting unit is not exactly the same.

During image scanning, the digital value corresponding to each pixel of the to-be-scanned document is obtained by comparing the analog electronic signal corresponding to the to-be-scanned document with the analog electronic signal corresponding to the standard white. In order to improve the quality of scanning image, the digital value corresponding to the scanning image near the ends of the to-be-scanned document is needed to be compensated by the method of digital signal processing due to the dim lightness of the ends of the light source 108.

However, the adhesive, such as glue, for adhering the lower calibration paper 120 to the transparent platen 104 is likely to stain the lower calibration paper 120. Also, the impurities, such as dust, are likely to contaminate the lower calibration paper 120. The intensity of the light reflected by the lower calibration paper 120 is therefore affected, and the error of color calibration is occurred. To reduce such kind of error, the general solution is making the lower carriage 106 scan numerous scan lines (such as 50) on the lower calibration paper 120 so that more standard white digital values can be obtained, and the average standard white digital value obtained by averaging these standard white digital values.

Referring to FIG. 3, which depicts the conventional duplex scanner. The duplex scanner is the scanner capable of scanning the two-sided document. The automatic document feeder (ADF) 302 is usually installed above the conventional flatbed scanner 100. When the to-be-scanned document (not shown in FIG. 3) on the sheet input plate 304 of the automatic document feeder 302 is send into the scanner, it is transmitted along the paper guide (not shown in FIG. 3) and send to the sheet output plate 306 after scanning. When the to-be-scanned document is transmitted along the paper guide, an upper carriage 308, permanently fixed to the automatic document feeder 302, is scanning one side of the document, and the lower carriage 106 under the document is scanning the other side of the document. In this case, the upper carriage 308 is always installed in the automatic document feeder 302.

Similarly, before the upper carriage 308 starts to scan, a calibration procedure is needed. Color calibration is taken as an example herein. Light is first emitted by the light source 310 at the upper carriage 308 and then reflected by the upper calibration paper 314 fixed on the transparent platen 104. Subsequently, light reflected from the upper calibration paper 314 is further reflected by several reflectors 318, and focused on the photoelectric sensing device 316 of the upper carriage 308 by the lens 320. Afterward, light received by the photoelectric sensing device 316 is converted into analog electronic signals. The analog electronic signals corresponding to the standard white of the upper calibration paper 314 are further converted to the standard white digital value corresponding to the upper carriage 308.

However, in the scanner 100 having the automatic document feeder 302, the upper carriage 308 and the upper calibration paper 314 is permanently fixed to the automatic document feeder 302 and the transparent platen 104, respectively. The poor condition certainly occurs that the upper carriage 308 is not able to scan numerous scan lines on the upper calibration paper 314 due to the lack of relative motion. Therefore, the upper carriage 308 always scans the certain scan line on the upper calibration paper 314 and the average standard white digital values cannot be obtained. If the upper calibration paper 314 is stained or contaminated, the error of the standard white digital values is increased, and the quality of scanned image is seriously affected.

SUMMARY OF THE INVENTION

It is therefore an object of the invention to provide a duplex scanner capable of calibrating two-sided documents, so that the upper carriage in the automatic document feeder is capable of scanning numerous scan lines on the upper calibration paper, and the average standard digital values is obtained. The effects upon the calibration of the light beam information due to the contaminated upper calibration paper can be reduced, and the quality of the scanning image is greatly enhanced.

According to the objective of the invention, a duplex scanner capable of calibrating two-sided documents is provided. An automatic document feeder is equipped above the duplex scanner. The duplex scanner includes an upper carriage and an upper calibration paper. The upper carriage is installed in the automatic document feeder, and the upper calibration paper is installed under the upper carriage. Before image scanning, the relative motion between the upper carriage and the upper calibration paper is generated in order to calibrate the light beam information.

According to another objective of the invention, a duplex scanner capable of calibrating two-sided documents is provided. An automatic document feeder is equipped above the duplex scanner. The duplex scanner includes an upper carriage and an upper calibration paper. The upper carriage is movably installed in the automatic document feeder while the upper calibration paper is fixed in the duplex scanner and corresponding to the upper carriage. Before image scanning, the relative motion between the upper carriage and the upper calibration paper is generated in order to calibrate the light beam information.

BRIEF DESCRIPTION OF THE DRAWINGS

Other objects, features, and advantages of the invention will become apparent from the following detailed description of the preferred but non-limiting embodiments.

The description is made with reference to the accompanying drawings in which:

FIG. 5 depicts the duplex scanner capable of calibrating the two-sided document according to the second embodiment of the invention.

DESCRIPTION OF THE PREFERRED EMBODIMENTS

In order to achieve the objective of the invention, the relative motion between the upper carriage and the upper calibration paper is generated, so that the upper carriage in the automatic document feeder is capable of scanning numerous scan lines of the upper calibration paper for calibrating the light beam information.

In the invention, the duplex scanner capable of calibrating the two-sided document includes an automatic document feeder, an upper carriage, and an upper calibration paper, wherein the upper carriage is fixed in the automatic document feeder while the upper calibration paper is placed below the upper carriage. Before scanning the to-be-scanned document, the calibration of the light beam information is carried out by the relative motion between the upper carriage and the upper calibration paper.

Another way to achieve the objective of the invention is placing the upper carriage in the automatic document feeder and fixing the upper calibration paper in the scanner. Before scanning the to be-scanned document, the calibration of the light beam information is carried out by the relative motion between the upper carriage and the upper calibration paper. The two embodiments are illustrated as follows.

Figure 1:
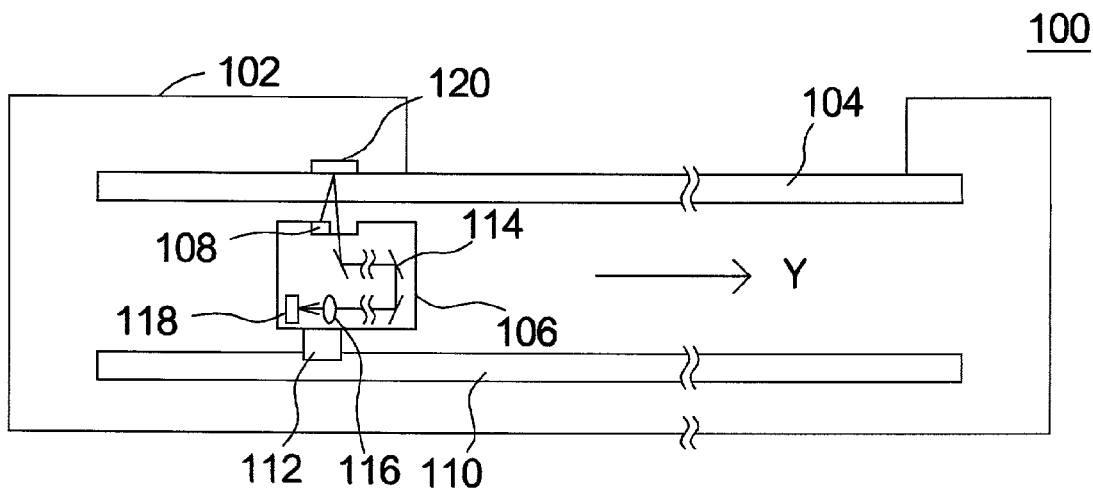
FIG. 1 depicts the conventional flatbed scanner.
Figure 2:
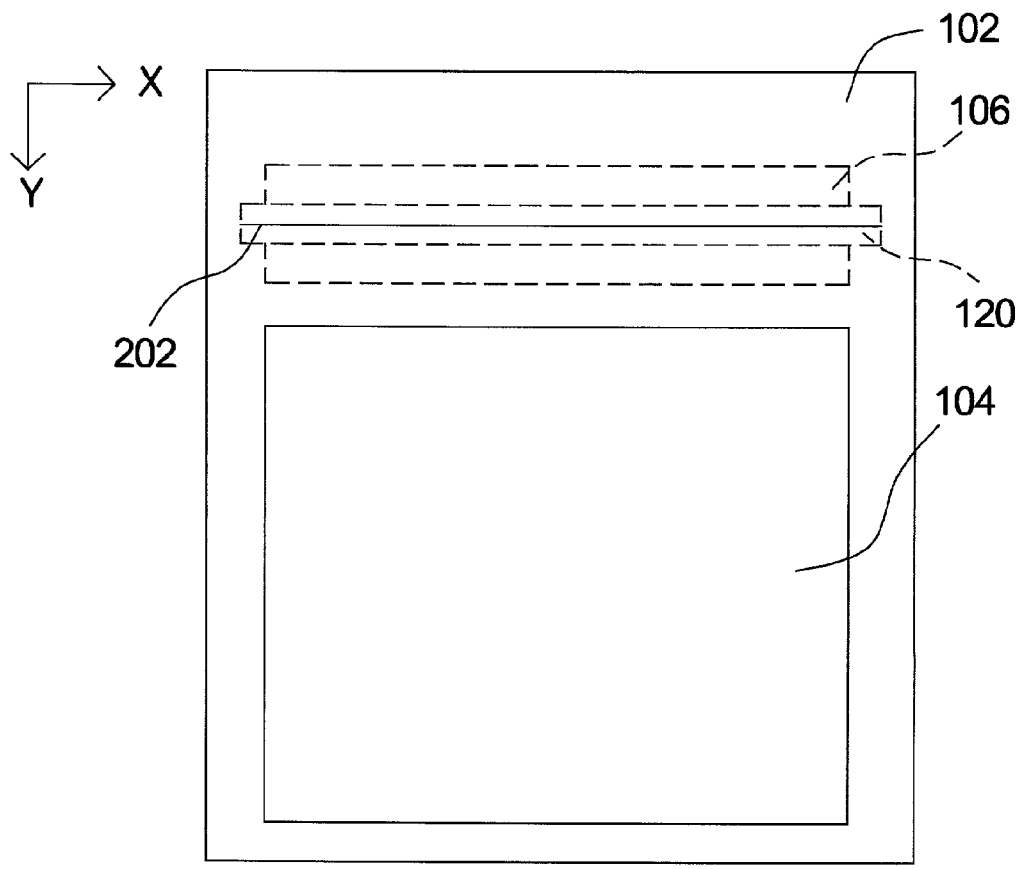
FIG. 2 depicts a top view of the conventional flatbed scanner in FIG. 1 during the calibration of the light beam information.
Figure 3:
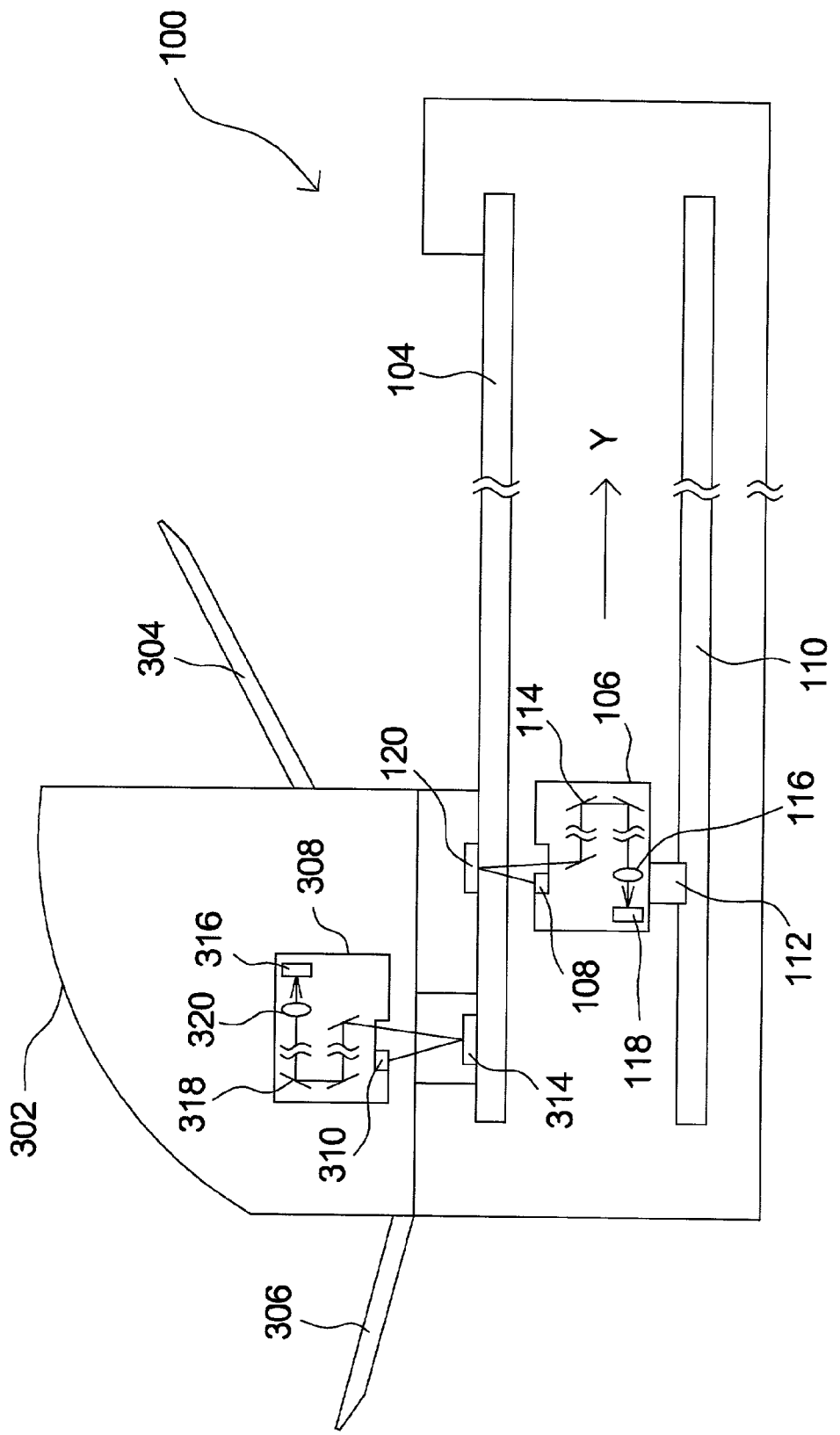
FIG. 3 depicts the conventional duplex scanner.
Figure 4:
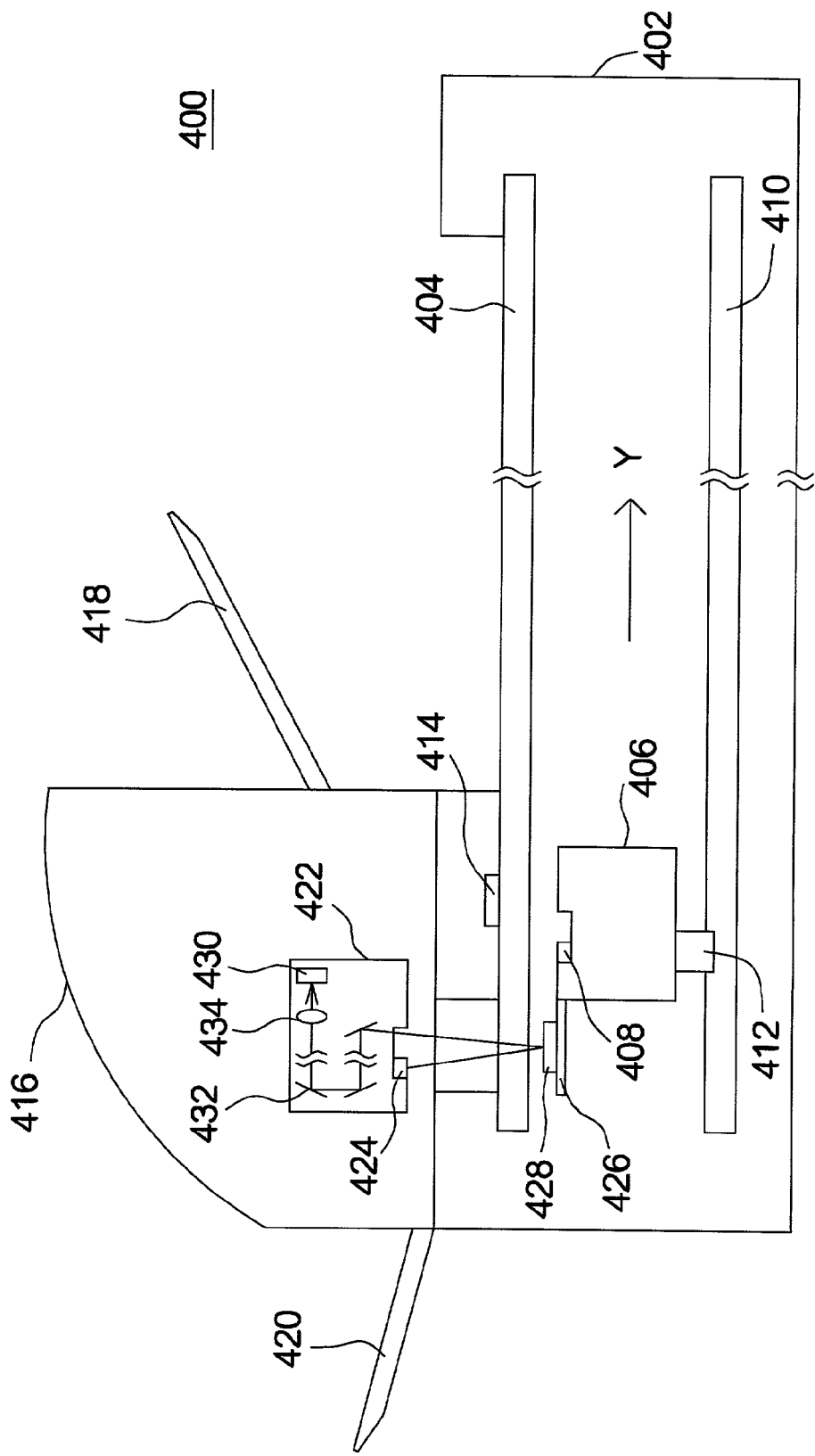
FIG. 4 depicts the duplex scanner capable of calibrating the two-sided document according to the first embodiment of the invention.

Embodiment 1:

Referring to FIG. 4, which depicts the duplex scanner capable of calibrating the two-sided document according to the first embodiment of the invention. The duplex scanner 400 has a case 402, and the to-be-scanned document (not shown in FIG. 4) is placed on the transparent platen 404. A lower carriage 406 is installed inside the case 402, and a light source 408 is equipped on the lower carriage 406. The duplex scanner 400 of the invention also has the driving device 410 to move the lower carriage 406 forward and backward in a direction parallel to Y-axis. Additionally, a connecting apparatus 412 is equipped for connecting the lower carriage 406 and the driving device 410. The driving device 410 can be any device that is capable of transmitting the lower carriage 406, such as a leather belt, a steel belt, or the like. The driving device 410 is connected to a transmitting apparatus (not shown in FIG. 4), such as the assembly of reduction gears and a motor.

The scanner 400 equipped with an upper carriage 422 is capable of two-side scanning. The upper carriage 422 is installed in an automatic document feeder 416, which is installed above the case 402. When the to-be-scanned document (not shown in FIG. 4) on the sheet input plate 418 of the automatic document feeder 416 is send into the scanner 400, it is transmitted along the paper guide (not shown in FIG. 4) and send to the sheet output plate 420 after scanning. When the to-be-scanned document is transmitted along the paper guide, the upper carriage 422, fixed at the automatic document feeder 416, scans one side of the document, and the lower carriage 406 scans the other side of the document.

Calibration of the light information is a critical procedure before carriages start to scan. To process the calibration, the driving device 410 first moves the lower carriage 406 below the lower calibration paper 414, which is fixed on the transparent platen 404.

Similarly, before the upper carriage 422 starts to scan, a calibration procedure is needed. In order to calibrate the light beam information, a relative motion between the upper carriage 422 and the upper calibration paper 428 is required. Accordingly, situating a lower carriage 406 having an extending board 426 in the scanner 400 and fixing the upper calibration paper 428 on the extending board 426 the relative motion can generate the relative motion. Thus, by the movement of the lower carriage 406, there is a relative motion between the upper calibration paper 428 and the upper carriage 422.

Color calibration is taken as an example to illustrate the application of the duplex scanner of the invention. Light is first emitted by the light source 424 at the upper carriage 422 and then reflected by the upper calibration paper 428 fixed on the extending board 426 of the lower carriage 406. Subsequently, light reflected from the upper calibration paper 428 is further reflected by several reflectors 432, and focused on the photoelectric sensing device 430 of the upper carriage 422 by the lens 434. Afterward, light received by the photoelectric sensing device 430 is converted into analog electronic signals. The analog electronic signals corresponding to the standard white of the upper calibration paper 428 are further converted to the standard white digital values corresponding to the upper carriage 422.

The photoelectric sensing device can be any device capable of converting the light signal into the electric signal, such as a Charged Coupled Device (CCD), or a Contact Image Sensor (CIS).

According to the preferred embodiment of the invention, the upper carriage 422 is able to scan numerous scan lines on the upper calibration paper 428 since a relative motion between the upper carriage 422 and upper the calibration paper 428 is produced while the lower carriage 406 is transmitted. Every scan line corresponds to a standard white digital value. Numerous scan lines correspond to numerous standard white digital values. The upper carriage 422 of the invention scans numerous scan lines so that more standard white digital values can be obtained. The average standard white digital value obtained by averaging these standard white digital values is apparently more accurate than the value obtained by a single scan line.

After the upper carriage 422 finishes the calibration of the light beam information, the driving device 410 moves the lower carriage 406 under the lower calibration paper 414 in order to perform the calibration of the light beam information of the lower carriage 406.

Embodiment 2:

Referring to FIG. 5, which depicts the duplex scanner capable of calibrating the two-sided document according to the second embodiment of the invention. The duplex scanner 500 has a case 502, and the to-be-scanned document (not shown in FIG. 5) is placed on the transparent platen 504. The lower carriage 506 is installed inside the case 502, and a light source 508 is equipped on the lower carriage 506. The duplex scanner 500 also has a driving device 510 to drive the lower carriage 506 forward and backward in a direction parallel to Y-axis, and a connecting apparatus 512 to connect the lower carriage 506 and the driving device 510. The driving device 510 can be any device that is capable of transmitting the lower carriage 506 under the lower calibration paper 514.

The scanner 500 equipped with an upper carriage 522 is capable of two-side scanning. When the to-be-scanned document (not shown in FIG. 5) on the sheet input plate 518 is sending into the duplex scanner 500, it is transmitted along the paper guide (not shown in FIG. 5) to the sheet output plate 520 after scanning. During the transmitting of the to-be-scanned document along the paper guide, an upper carriage 522, installed in the automatic document feeder 516, scans the one side of the document, and the lower carriage 506 scans the other side of the document. A light source 524 is equipped on the upper carriage 522.

Similarly, calibration of the light information is a critical procedure before carriages start to scan. In order to calibrate the light beam information, a relative motion between the upper carriage 522 and the upper calibration paper 528 is required. The objective of generating the relative motion is therefore achieved by installing the upper carriage 522 inside the automatic document feeder 516 while fixing the upper calibration paper 528 in the scanner, such as fixing it on the transparent platen 504. In this case, the upper carriage 522 in the automatic document feeder 516 is movable while the upper calibration paper 528 is fixed.

Accordingly, in FIG. 5, to generate the relative motion between the upper carriage 522 and the upper calibration paper 528, the upper carriage 522 is connected to the driving device 532 through the connecting apparatus 534, so that the driving device 532 is able to move the upper carriage 522 back and forth in a direction parallel to Y-axis. Therefore, the movable upper carriage 522 moved by the driving device 532 can scan numerous scan lines on the fixed upper calibration paper 528, and a more accurate standard white digital value is obtained.

It is illustrated as follows that the upper carriage 522 scans 50 scan lines on the upper calibration paper 528 to obtain the average standard white digital value. If the image resolution of the scanner is 600 dpi (dots per inch), the 50 scan lines correspond to $^{50}/_{600}$ inches. Hence, it is only $^{50}/_{600}$ inches that the driving device 532 and the transmitting apparatus (not shown in FIG. 5) need to move the upper carriage 522. Although the space of the automatic document feeder is not large, moving $^{50}/_{600}$ inches is still practical. The transmitting apparatus are such as the assembly of reduction gears and a motor.

In the preferred embodiment described herein, the advantage of the duplex scanner capable of calibrating the two-sided document according to the invention is that the relative motion between the upper carriage and the upper calibration paper is produced so that the upper carriage is capable of scanning numerous scan lines on the upper calibration paper, and the average standard white digital values for calibrating the light beam information can be obtained. Thus, the effects of the contaminated calibration paper for the calibration of the light beam information can be reduced, and the quality of the scanning image is greatly enhanced.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A duplex scanner capable of calibrating a two-sided document, comprising:

an automatic document feeder;

an upper carriage installed in the automatic document feeder;

an upper calibration paper installed under the upper carriage;

a case;

a transparent platen fixed on the case for receiving a to-be-scanned document;

a lower calibration paper fixed to the transparent platen; and a lower carriage installed inside the case, the lower carriage having an extending board for attaching the upper calibration paper, and the upper calibration paper simultaneously moving with the lower carriage along the same direction;

wherein the upper calibration paper is moved under the upper carriage by moving the lower carriage, so that the upper carriage is capable of scanning a plurality of scan lines on the upper calibration paper for calibrating the light beam information before image scanning.

* * * * *